(12) United States Patent
Han et al.

(10) Patent No.: US 7,695,821 B2
(45) Date of Patent: Apr. 13, 2010

(54) COMPOSITE BINDER FOR AN ELECTRODE WITH DISPERSANTS CHEMICALLY BOUND

(75) Inventors: Chang Sun Han, Daejeon (KR); Hae Young Kim, Incheon (KR); Ju Hyun Kim, Daejeon (KR); Dong Jo Ryu, Daejeon (KR)

(73) Assignee: LG Chem, Ltd. (KR)

( * ) Notice: Subject to any disclaimer, the term of this patent is extended or adjusted under 35 U.S.C. 154(b) by 284 days.

(21) Appl. No.: 10/556,258

(22) PCT Filed: May 31, 2004

(86) PCT No.: PCT/KR2004/001287

§ 371 (c)(1),
(2), (4) Date: Nov. 10, 2005

(87) PCT Pub. No.: WO2004/107481

PCT Pub. Date: Dec. 9, 2004

(65) Prior Publication Data

US 2007/0055023 A1    Mar. 8, 2007

(30) Foreign Application Priority Data

Jun. 3, 2003   (KR) .................. 10-2003-0035653

(51) Int. Cl.
*B32B 27/00* (2006.01)
*H01M 4/02* (2006.01)
*H01M 4/60* (2006.01)

(52) U.S. Cl. .................. 428/500; 429/209; 429/212

(58) Field of Classification Search ................ None
See application file for complete search history.

(56) References Cited

U.S. PATENT DOCUMENTS 6,048,916 A    4/2000   Hirata et al.
6,194,514 B1   2/2001   Scheuermann et al.
6,573,004 B1 * 6/2003   Igarashi et al. .............. 429/217

FOREIGN PATENT DOCUMENTS

| EP | 0778317 | 3/2003 |
|----|---------|--------|
| JP | 06072759 | 3/1994 |
| JP | 11-297313 | 10/1999 |
| JP | 11-297328 | 10/1999 |
| JP | 11-297329 | 10/1999 |
| JP | 2001-035496 A | 2/2001 |
| JP | 2002-256129 A | 9/2002 |
| JP | 2003-123766 A | 4/2003 |
| KR | 2000-0075953 | 12/2000 |
| KR | 1020040001763 | 1/2004 |

OTHER PUBLICATIONS

PCT International Search Report; International Application No. PCT/KR2004/001287; Internation Filing Date: May 31, 2004; Mailing Date: Oct. 14, 2004.
Chinese Office Action dated Dec. 29, 2006 for Application No. 200480008079.7 (All references cited in Office Action are listed above).

* cited by examiner

*Primary Examiner*—Sheeba Ahmed
(74) *Attorney, Agent, or Firm*—Cantor Colburn LLP

(57) ABSTRACT

The present invention provides a polymeric composite binder which comprises binder polymer and a dispersant chemically bound to the surface of the binder polymer, as well as an electrode slurry, electrode and secondary battery using the same. By virtue of the dispersant chemically bound to the binder polymer surface, the present invention achieves an improvement in the stability of binder latex, an improvement in the dispersion and coating properties of electrode slurry, and also an improvement in the capacity and cycle characteristic of a battery.

8 Claims, No Drawings

COMPOSITE BINDER FOR AN ELECTRODE WITH DISPERSANTS CHEMICALLY BOUND

This application is a national stage application of PCT/KR2004/001287, filed May 31, 2004, which claims the benefit of the filing date of Korean Patent Application No. 2003-0035653, filed Jun. 3, 2003, in the Korean Intellectual Property Office, the disclosure of which is incorporated herein in its entirety by reference.

TECHNICAL FIELD

The present invention relates to a polymeric composite binder for electrodes, which comprises binder polymer and a dispersant chemically bound to the surface of the binder polymer.

BACKGROUND ART

Recently, studies to reduce the size and weight of portable electronic devices, such as portable computers, portable telephones and camcorders, are being steadily conducted. In addition, secondary batteries, which are used as electricity sources for such electronic devices, require higher capacity, smaller size, lighter weight and thinner thickness. Among secondary batteries, following research and development of lithium-ion secondary batteries, such batteries are being produced and sold, because of their advantages, such as high voltage, long lifespan and high energy density.

The lithium-ion secondary battery is composed of a positive electrode, a negative electrode, a separator and an electrolyte solution. This battery has a structure of positive electrode-electrolyte solution-separator-electrolyte solution-negative electrode and exhibits battery characteristics not only by an electric charging process in which lithium ions migrate from the positive electrode to the negative electrode and are intercalated into the negative electrode, but also by an electric discharge process in which the lithium ions migrate from the negative electrode to the positive electrode.

Each of the electrodes (positive and negative electrodes) comprises a collector and an electrode film, in which the electrode film includes an electrode active material, a conducting agent and an electrode binder. Although an element which ultimately determines the properties of the electrodes is the electrode active material, the electrode binder which renders the electrode active material adhesive and serves to fix the electrode film to the collector also plays an important role.

For example, an electrode is prepared by a method comprised of uniformly dispersing an electrode active material, a conducting agent and an electrode binder in a solvent, to prepare electrode slurry, and then coating the electrode slurry on a collector. In this case, the dispersion and coating properties of the electrode slurry will be important.

A typical material for use as an electrode binder is polyvinylidene fluoride (PVDF) polymer which is used as a solution in an organic solvent, such as N-methyl-2-pyrrolidone (NMP). However, the PVDF binder causes an environmental problem resulting from the use of the NMP organic solvent and has a shortcoming in that it needs to be used at increased amounts for application to high-capacity secondary batteries. For this reason, studies on water-based binders, which can exhibit sufficient adhesion even at small amounts, are being conducted.

However, there is still no report on a water-based binder which can adjust the dispersion and coating properties of the electrode slurry.

DISCLOSURE OF THE INVENTION

The present invention is based on experimental findings that, if a dispersant is added at more than 50% conversion of monomer(s) to binder polymer during a polymerization reaction for forming the binder polymer so that the dispersant is chemically bound to the surface of the binder polymer, the effect of the dispersant on the dispersion and coating properties of electrode slurry will be maximized and the dispersant will contribute to an increase in the capacity of a battery and to an improvement in the cycle characteristic of the battery.

An object of the present invention is to provide a polymeric composite binder with excellent dispersion and coating properties.

Another object of the present invention is to provide active material slurry with excellent dispersion and coating properties, which comprises said polymeric composite binder.

Still another object of the present invention is to provide a lithium-ion secondary battery electrode with excellent adhesion to a collector, using said active material slurry.

Yet another object of the present invention is to provide a lithium-ion secondary battery with excellent battery capacity and cycle characteristic, using said electrode.

To achieve the above-mentioned objects, the present invention provides a polymeric composite binder for electrodes, which comprises binder polymer and a dispersant chemically bound to the surface of the binder polymer.

The polymeric composite binder of the present invention is characterized in that the dispersant is chemically and preferably covalently bound to the binder polymer.

Although the dispersant may be added any time during a process for the preparation of the binder polymer, the dispersant is preferably added after the conversion of monomer(s) to binder polymer reaches a level of at least 50% during a polymerization reaction for forming the binder polymer, in order to maximize its effect on the coating properties of active material slurry.

The present invention is characterized in that, after the conversion of monomer(s) to binder polymer reaches a level of at least 50%, the dispersant is added so as to increase the surface area of the binder, such that adhesion necessary for battery characteristics can be ensured with a minimal amount of the binder.

The dispersant consists of a water-soluble monomer or its polymer, and serves to convert the hydrophobic surface of the binder polymer into a hydrophilic surface such that the binder polymer is distributed in a more stable and uniform manner in water, a dispersion medium. Unlike the case where a dispersant is simply physically adsorbed on the binder polymer surface, the inventive polymeric composite binder particle comprising the dispersant chemically bound to the binder polymer maintains strong binding of the dispersant to the binder polymer even when external force is applied during the preparation of active material slurry (e.g., stirring). Thus, the inventive binder particle shows a uniform dispersion property in the active material slurry, an excellent coating property on a collector, and uniform adhesion to the electrode surface, and positively contributes to an increase in the capacity of a battery and to an improvement in the cycle characteristic of the battery.

Examples of monomeric units for forming the binder polymer used in the present invention include aromatic vinyl monomer (e.g., styrene, α-methylstyrene, β-methylstyrene, divinylbenzene, etc.); a conjugated diene monomer (e.g., 1,3-butadiene, isoprene, 2,3-dimethyl-1,3-butadiene, 1,3-pentadiene, etc.); (meth)acrylic ester monomer (e.g., methyl(meth)acrylate, ethyl(meth)acrylate, propyl(meth)acrylate, isopropyl(meth)acrylate, n-butyl(meth)acrylate, isobutyl(meth)acrylate, n-amyl(meth)acrylate, isoamyl(meth)acrylate, n-hexyl(meth)acrylate, 2-ethylhexyl(meth)acrylate, hydroxyethyl(meth)acrylate, lauryl(meth)acrylate, etc.); nitrile monomer (e.g., acrylonitrile, methacrylonitrile, etc); and unsaturated carboxylic acid monomer (e.g., acrylic acid, methacrylic acid, itaconic acid, fumaric acid, citraconic acid, methaconic acid, glutarconic acid, crotonic acid, isocrotonic acid, etc.). Homopolymerization of one of such monomers or copolymerization of two or more of such monomers can result in the preparation of binder polymer. For copolymerization, 2 to 15 monomers are preferably used.

In addition, as polymerization additives, a molecular weight-adjusting agent, such as t-dodecylmercaptane, n-dodecylmercaptane or n-octylmercaptane, and a crosslinking agent, such as 1,3-butanediol diacrylate, 1,3-butanediol dimethacrylate, 1,4-butanediol diacrylate, 1,4-butanediol dimethacrylate, aryl acrylate, aryl methacrylate, trimethylpropane triacrylate, tetraethyleneglycol diacrylate, tetraethyleneglycol dimethacrylate, or divinylbenzene, may be used.

As a polymerization initiator, any compound capable of causing crosslinking reaction may be used. Concrete examples of such a polymerization initiator include ammonium persulfate, potassium persulfate, benzoyl peroxide, azobisbutyronitrile, butyl hydroperoxide, and cumene hydroperoxide. Among them, water-soluble or redox polymerization initiators are preferred.

The dispersant which is used in the present invention can be selected from the group consisting of:

(1) an alkoxypolyalkyleneoxide (meth)acrylic acid ester (first dispersant) represented by the following formula 1;

(2) a (meth)acrylic acid-derived monomer (second dispersant) represented by the following formula 2;

(3) a reactive surfactant (third surfactant) represented by the following formula 3;

(4) a copolymer (forth dispersant) comprising 50-90 wt % of the monomer of the first dispersant, 5-45 wt % of the monomer of the second dispersant monomer, and 0.5-40 wt % of the monomer of the third dispersant; and (5) a polycarboxylic acid monomer (fifth dispersant) represented by the following formula 4. Moreover, such dispersants may be used alone or in a mixture of two to five thereof.

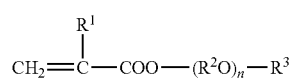

[Formula 1]

wherein $R^1$ is a hydrogen atom or methyl; $R^2O$ is alkylene oxide with 1 to 4 carbon atoms or a mixture of two or more of the alkylene oxides, and if it is the mixture, it can be added in a random or block form; $R^3$ is alkyl with 1 to 4 carbon atoms; and n is an integer of 1-50.

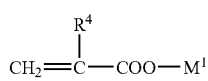

[Formula 2]

wherein $R^4$ is a hydrogen atom or methyl; $M^1$ is a hydrogen atom, monovalent metal atom, divalent metal atom, ammonium or organic amine group.

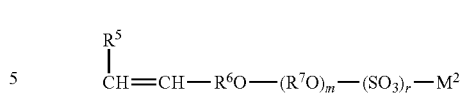

[Formula 3]

wherein $R^5$ is a hydrogen atom or methyl; $R^6$ is alkylene with 1 to 4 carbon atom, phenylene or alkyl phenylene with 1 to 4 carbon atoms; $R^7O$ is alkylene oxide with 1 to 4 carbon atoms or a mixture of two or more of the alkylene oxides, and if it is the mixture, it can be added in a random or block form; and $M^2$ is a hydrogen atom, monovalent metal atom, divalent metal atom, ammonium or organic amine group; m is an integer of 10-50; and r is 0 or 1.

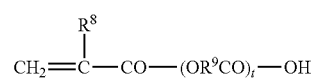

[Formula 4]

wherein $R^8$ is a hydrogen atom or methyl; $R^9$ is alkylene oxide with 1 to 4 carbon atoms, and t is an integer of 1-10.

Examples of the monomer represented by the formula 1 include methoxypolyethylene oxide (meth)acrylate, methoxypolypropyleneoxide (meth)acrylate, methoxypolybutyleneoxide (meth)acrylate; methoxypolyethyleneoxide polypropyleneoxide (meth)acrylate, methoxypolyethyleneoxide polybutyleneoxide (meth)acrylate, methoxypolypropyleneoxide polybutyleneoxide (meth)acrylate; methoxypolyethyleneoxide polypropyleneoxide polybutyleneoxide (meth)acrylate; ethoxypolyethyleneoxide (meth)acrylate; ethoxypolypropyleneoxide (meth)acrylate; ethoxypolybutyleneoxide (meth)acrylate; ethoxypolyethyleneoxide polypropyleneoxide (meth)acrylate, ethoxypolyethyleneoxide polybutyleneoxide (meth)acrylate; ethoxypolypropyleneoxide polybutyleneoxide (meth)acrylate, and ethoxypolyethyleneoxide polypropyleneoxide polybutyleneoxide (meth)acrylate. Such monomers may be used alone or in a mixture of two or more thereof.

Examples of the monomer represented by the formula 2 include acrylic acid, methacrylic acid, and monovalent metal salts, divalent metal salts, ammonium salts and organic amine salts of such acids. Such monomers may be used alone or in a mixture of two or more thereof.

Examples of the surfactant represented by the formula 3 include sulfoxypolyalkyleneoxide allylethers, such as sulfoxypolyethyleneoxide allylether, sulfoxypolypropyleneoxide allylether, sulfoxypolybutyleneoxide allylether, sulfoxypolyethyleneoxide 2-butenylether, sulfoxypolypropyleneoxide 2-butenylether, sulfoxypolybutyleneoxide 2-butenylether, sulfoxypolyethyleneoxide 3-butenylether, sulfoxypolypropyleneoxide 3-butenylether, sulfoxypolybutyleneoxide 3-butenylether, sulfoxypolyethyleneoxide 3-pentenylether, sulfoxypolypropyleneoxide 3-pentenylether, and sulfoxypolybutyleneoxide 3-pentenylether; sulfoxypolyalkyleneoxide alkylvinylphenylethers, such as sulfoxypolyethyleneoxide (3-vinyl-5-ethyl)phenylether, sulfoxypolypropyleneoxide (3-vinyl-5-ethyl)phenylether, sulfoxypolybutyleneoxide (3-vinyl-5-ethyl)phenylether, sulfoxypolypropyleneoxide (3-propenyl-5-propyl) phenylether, sulfoxypolybutyleneoxide(3-propenyl-5-propyl)phenylether, sulfoxypolyethyleneoxide (3-propenyl-5-butyl)phenylether, sulfoxypolypropyleneoxide (3-propenyl-5-butyl)phenylether, and sulfoxypolybutyleneoxide (3-propenyl-5-butyl)phenylether; 2-sulfoxypoly-alkyleneoxide-3-(4-alkylphenoxy)propyleneallylethers, such as 2-sulfoxypolyethyleneoxide-3-(4-methylphenoxy) propyleneallylether, 2-sulfoxypolypropyleneoxide-3-(4-methylphenoxy)propyleneallylether, 2-sulfoxypolybutyleneoxide-3-(4-methylphenoxy)propyleneallylether, 2-sulfoxypolyethyleneoxide-3-(4-ethylphenoxy)propyleneallylether, 2-sulfoxypolypropyleneoxide-3-(4-ethylphenoxy)propyleneallylether, and 2-sulfoxypolybutyleneoxide-3-(4-ethylphenoxy)propyleneallylether; and monovalent salts, divalent salts, ammonium salts and organic amine salts thereof. Such surfactants may be used alone or in a mixture of two or more thereof.

Examples of the monomer represented by the formula 4 include polycarboxyethyl (meth)acrylate, polycarboxymethyl (meth)acrylate, and polycarboxylbutyl (meth)acrylate, and such monomers may be used alone or in a mixture of two or more thereof.

The above-mentioned monomers used as the dispersant is characterized in that they contain water-soluble functional groups. Thus, if the dispersant is present on the surface of the binder polymer as in the present invention, the dispersant will contribute to the polymerization stability and storage stability of the binder polymer, and contribute to uniform adhesion between active materials resulting from uniform distribution of the binder in active material slurry during the preparation of the active material slurry, and also greatly contribute to uniform and excellent adhesion between the active material and the collector during the fabrication of electrodes.

Furthermore, the dispersant preferably forms 0.01-30 wt % of the total solid content of the polymeric composite binder. If the content of the dispersant is less than 0.01 wt %, the characteristics of the binder will be deteriorated, and if it is more than 30 wt %, the stability of binder latex will be reduced.

If the dispersant monomer is added during the latter half of the binder polymerization process (at a polymerization conversion of more than 50%), the dispersant content on the surface of the binder particle will be increased. This improves the stability of binder latex and the dispersion property of electrode slurry, and allows uniform and effective dispersion of the binder which is present between the active materials of a prepared electrode. If the dispersant monomer is added at a polymerization conversion of less than 50%, it will be buried in the binder particle so as not to function as a dispersant. If it is added after completion of the polymerization, it will be simply physically mixed with the binder particle, resulting in a reduction in its contribution to the stability of binder latex and the dispersion property of electrode slurry.

It is preferred in the present invention that a polymeric composite binder containing the binder polymer and the dispersant is prepared by emulsion polymerization.

According to the present invention, the polymeric composite binder prepared from the polymerization monomer and the dispersant can act as a water-based binder using water as a dispersion medium. Thus, by using the water-based polymer binder employing water as a dispersion medium, in place of the existing PVDF using an NMP organic solvent as a dispersion medium, the present invention can increase the adhesion of binder polymer and make a process environment-friendly. Moreover, it was found that not only a dispersion property in a preparation process of electrode slurry but also a coating property in a process of slurry coating on a collector are excellent, and the battery capacity and cycle characteristics of a lithium-ion secondary battery including the electrode prepared as such are improved.

The secondary battery according to the present invention comprises a positive electrode, a negative electrode and an electrolyte solution, in which the positive and negative electrodes are comprised of 1) an electrode active material and 2) the polymeric composite binder according to the present invention.

The electrode active material is an important material that determines the capacity of a battery, and examples of an active material for use in the positive electrode include conductive polymers, such as polypyrrole, polyaniline, polyacetylene and polythiophene; metal oxides, such as $TiS_2$, $TiS_3$, $Cu_2V_2O_3$, amorphous $V_2O$—$P_2O_5$, $V_6O_{13}$, lithium cobalt oxide, lithium nickel oxide and lithium manganese oxide; and composite metal oxides of metal oxides and conductive polymers. Moreover, examples of a negative electrode active material include carbonaceous materials, such as natural graphite, artificial graphite, MPCF, MCMB, PIC, phenol resin plastic, PAN carbon fiber, and graphite; conductive polymers, such as polyacene; and lithium metals, such as lithium and lithium alloys.

In addition to the active material, the electrode slurry may contain a conducting agent, a viscosity adjuster, an assistant binder, etc., if necessary. Examples of the viscosity adjuster include water-soluble polymers, such as carboxylmethylcellulose, carboxylethylcellulose, ethylcellulose, hydroxymethylcellulose, hydroxypropylcellulose, carboxyethylmethylcellulose, polyethylene oxide, and ethyleneglycol.

As the conducting agent, an electron conducting material which does not cause a chemical change in a battery is used. Concrete examples thereof include natural graphite, such as flaky graphite, scale-like graphite, and earthy graphite; conductive fibers, such as petroleum cokes, celluloses, sugars, mesophase-pitch, artificial graphite (e.g., graphites, carbon black such as acetylene black and channel black, asphalt pitch, coal tar, activated carbon, etc), and metal fibers.

The electrolyte solution contains a support electrolyte (e.g., $LiPF_6$, $LiClO_4$, $LiBF_4$, $LiN(SO_2CF_3)_2$ etc.) and a mixed solvent which is prepared by suitably mixing high-dielectric solvents (e.g., ethyl carbonate, propyl carbonate, ethylmethyl carbonate, dimethyl carbonate, diethyl carbonate, etc.).

BEST MODE FOR CARRYING OUT THE INVENTION

The present invention will hereinafter be described in further detail by examples and comparative examples. It will however be obvious to a person skilled in the art that the present invention is not limited to or by the examples.

EXAMPLE 1

Preparation of Polymeric Composite Binder 93.0 g of ion-exchanged water was charged into a reactor and its temperature was elevated to 75° C. As the temperature of ion-exchanged temperature reached 75° C., 5.8 g of butyl acrylate, 4.3 g of styrene, and 0.1 g of sodium lauryl sulfate were added into the reactor. While maintaining the temperature within the reactor at 75° C., a solution of 0.08 g of potassium sulfate in 5.0 g of ion-exchanged water was added into the reactor, thus preparing a seed.

To the seed, an emulsified mixture of 93.0 g of ion-exchanged water, 30.0 g of styrene, 60.1 g of butyl acrylate, 0.8 g of aryl methacrylate and 0.15 g of sodium lauryl sulfate was added in small portions for 3 hours, and at the same time, 0.21 g of potassium sulfate in 10.0 g of ion-exchanged water was added for 3 hours, thus achieving the preparation of binder polymer. At one hour before completion of the polymerization reaction, 5.5 g of ethoxypolyethyleneoxide acrylate, a first dispersant, was added to the emulsified mixture, thus chemically binding the dispersant to the binder polymer.

The resulting polymer was adjusted to pH 7 with potassium hydroxide, thus preparing a polymeric composite binder for electrodes.

Preparation of Electrode Slurry

Negative electrode slurry was prepared by mixing 94 g of natural graphite, 1.0 g of acetylene black as a conducting agent, 2.4 g of the polymeric composite binder prepared as described above and 2.5 g of water-soluble carboxylmethylcellulose polymer as a tackifier, in water as a dispersion medium and adjusting the total solid content of the mixture to 45%.

Positive electrode slurry was prepared by mixing 94 g of $LiCoO_2$ as an active material, 1.0 g of acetylene black as a conducting polymer, and 5.0 g of the polymeric composite binder prepared as described above, and adjusting the total solid content of the mixture to 45%.

Evaluation of Dispersion Property

In order to evaluate the dispersion property of the prepared slurry, the slurry was placed in a rheometer and then measured for a change in its viscosity while increasing a shear rate from 0.01 to 1,000. At this time, if a section showing an increase in viscosity without a continuous reduction in viscosity appears, it indicates that the dispersion of the slurry was not sufficiently achieved. This section occurs because energy is used in order to make the dispersion of the slurry more uniform. Thus, the dispersion property of the slurry was evaluated as O or X depending on the presence or absence of this increased viscosity section. Here, O represents the case where the increase in viscosity did not appear, indicating an excellent dispersion property, and X represents the case where the increase in viscosity appeared, indicating a bad dispersion property.

Fabrication of Electrode

The negative electrode active material prepared as described above was coated on a copper foil to a thickness of 200 μm. Also, the positive electrode active material prepared as described above was coated on an aluminum foil to a thickness of 200 μm. The resulting foils were dried in a dry oven at 90° C. for 20 minutes. Then, the dried foils were rolled to a suitable thickness, thus fabricating electrodes.

Evaluation of Coating Property

In order to evaluate the coating property of electrode slurry, electrode slurry having a solid content increased from 45% to 51% was prepared, and then coated on a collector to a thickness of 200 μm. The condition of the coated slurry was evaluated as O or X. Here, O represents the case where the slurry was completely coated on the collector, indicating an excellent coating property, and X represents the case where an uncoated portion of the collector appeared, indicating a bad coating property.

Evaluation of Adhesion

In order to measure the adhesion between the active material and the collector, an epoxy plate was adhered to the surface of the fabricated electrode to fix the active material. The collector which had been cut to a given thickness was peeled off while measuring 180° peeling strength. Evaluation was determined by the average of at least five measurements.

Fabrication of Lithium-Ion Secondary Battery

A separator made of a polyolefin-based microporous membrane was interposed between the negative and positive electrodes fabricated as described above, thus fabricating a coin-type battery. And, an electrolyte solution which had been prepared by dissolving $LiPF_6$ electrolyte in a mixed solvent of ethyl carbonate (EC) and ethyl methyl carbonate (EMC) (1:2 v/v) at a concentration of 1 mole/liter was added, thus completing the fabrication of the battery.

Evaluation of Battery Performance

To evaluate battery performance, 3 and 30 charge/discharge cycles were performed in the constant current manner at 0.1 C rate, and initial capacity, capacity after 3 cycles, and capacity after 30 cycles, were compared to each other. At least 5 coin-type batteries for the same binder composition were measured for performance, and then evaluation was determined by the average of at least five measurements.

EXAMPLE 2

A preparing process of a polymeric composite binder was performed in the same manner as in Example 1 except that the dispersant in Example 1 was replaced by 5.5 g of acrylic acid (second dispersant). Then, the preparation and evaluation of electrode slurry, electrodes and lithium-ion secondary batteries were performed in the same manner as in Example 1.

EXAMPLE 3

A preparing process of a polymeric composite binder was performed in the same manner as in Example 1 except that the dispersant in Example 1 was replaced by 5.5 g of sulfoxypolyethyleneoxide (3-propenyl-5-butyl) phenylether (third dispersant). Then, the preparation and evaluation of electrode slurry, electrodes and lithium-ion secondary batteries were performed in the same manner as in Example 1.

EXAMPLE 4

A preparing process of a polymeric composite binder was performed in the same manner as in Example 1 except that the dispersant in Example 1 was replaced by 5.5 g of CP-WB (fourth dispersant) (described in Korean Patent Laid-open Publication No. 2004-0001763) of the following formula 5. Then, the preparation and evaluation of electrode slurry, electrodes and lithium-ion secondary batteries were performed in the same manner as in Example 1.

$$-(CH_2-CH(CH_3))_p-(CH_2-C(CH_3))_q-(CH_2-CH)_r-(CH-CH(CH_3))_s- \quad \text{[Formula 5]}$$

with substituents: $COO(CH_2CH_2O)_{23}CH_3$, $COONa$, $COONa$, and phenyl ring with $R$ and $O-(CH_2CH_2O)_n-SO_3NH_4$

EXAMPLE 5

A preparing process of a polymeric composite binder was performed in the same manner as in Example 1 except that the dispersant in Example 1 was replaced by 5.5 g of polycarboxyethylacrylate (fifth dispersant). Then, preparing processes and evaluation methods of electrode slurry, electrodes and lithium-ion secondary batteries were performed in the same manner as in Example 1.

EXAMPLES 6 TO 12

In each of Examples 6 to 12, a preparing process of a polymeric composite binder was performed in the same manner as in Example 1 except that the dispersant in Example 1 was replaced by a dispersant given in Table 1. Then, the preparation and evaluation of electrode slurry, electrodes and lithium-ion secondary batteries were performed in the same manner as in Example 1.

TABLE 1

|  | Dispersants |
| --- | --- |
| Example 6 | 2.75 g of ethoxypolyethyleneoxide acrylate<br>2.75 g of acrylic acid |
| Example 7 | 2.75 g of ethoxypolyethyleneoxide acrylate<br>2.75 g of sulfoxypolyethylene(3-propenyl-5-butyl)phenylether |
| Example 8 | 2.75 g of ethoxypolyethyleneoxide acrylate<br>2.75 g of CP-WB |
| Example 9 | 2.75 g of ethoxypolyethyleneoxide acrylate<br>2.75 g of polycarboxyethyl acrylatate |
| Example 10 | 1.9 g of ethoxypolyethyleneoxide acrylate<br>1.8 g of acrylic acid<br>1.8 g of sulfoxypolyethyleneoxide(3-propenyl-5-butyl)phenylether |
| Example 11 | 1.4 g of ethoxypolyethyleneoxide acrylate<br>1.4 g of acrylic acid<br>1.4 g of sulfoxypolyethyleneoxide(3-propenyl-5-butyl)phenylether<br>1.3 g of CP-WB |
| Example 12 | 1.1 g of ethoxypolyethyleneoxide acrylate<br>1.1 g of acrylic acid<br>1.1 g of sulfoxypolyethyleneoxide(3-propenyl-5-butyl)phenylether<br>1.1 g of CP-WB<br>1.1 g of polycarboxyethylacrylate |

EXAMPLE 13

A preparing process of a polymeric composite binder was performed in the same manner as in Example 1 except that the dispersant was added at the amount of 16.5. Then, the preparation and evaluation of electrode slurry, electrodes and lithium-ion secondary batteries were performed in the same manner as in Example 1.

COMPARATIVE EXAMPLE 1

A preparing process of a polymeric binder was performed in the same manner as in Example 1 except that a dispersant was not added. Then, preparing processes and evaluation methods of electrode slurry, electrodes and lithium-ion secondary batteries were performed in the same manner as in Example 1.

COMPARATIVE EXAMPLE 2

A preparing process of a polymeric composite binder was performed in the same manner as in Example 1 except that a dispersant was added two hours before completion of the reaction. Then, the preparation and evaluation of electrode slurry, electrodes and lithium-ion secondary batteries were performed in the same manner as in Example 1.

COMPARATIVE EXAMPLE 3

A preparing process of a polymeric composite binder was performed in the same manner as in Example 3 except that a dispersant was added after completion of the reaction so that the dispersant was simply mixed to the binder polymer without being chemically bound to the binder polymer. Then, the preparation and evaluation of electrode slurry, electrodes and lithium-ion secondary batteries were performed in the same manner as in Example 1.

COMPARATIVE EXAMPLE 4

A preparing process of a polymeric binder was performed in the same manner as in Example 4 except that a dispersant was added after completion of the reaction so that the dispersant was simply mixed with the binder polymer without being chemically bound to the binder polymer. Then, the preparation and evaluation of electrode slurry, electrodes and lithium-ion secondary batteries were performed in the same manner as in Example 1.

Evaluation Results

The evaluation results for battery performance, dispersion property, coating property and adhesion in Examples 1-13 and Comparative Examples 1-4 are summarized in Table 2 below.

TABLE 2

|  | Battery performance | | | | | |
| --- | --- | --- | --- | --- | --- | --- |
|  | Initial capacity (mAh/g) | Capacity after 3 cycles (mAh/g) | Capacity after 30 cycles (mAh/g) | Dispersion property | Coating property | Adhesion (g/cm) |
| Example 1 | 308 | 293 | 275 | ◯ | ◯ | 6.3 |
| Example 2 | 309 | 294 | 275 | ◯ | ◯ | 9.3 |
| Example 3 | 305 | 291 | 274 | ◯ | ◯ | 5.2 |
| Example 4 | 307 | 292 | 274 | ◯ | ◯ | 5.5 |
| Example 5 | 305 | 290 | 272 | ◯ | ◯ | 8.6 |
| Example 6 | 308 | 294 | 275 | ◯ | ◯ | 7.8 |
| Example 7 | 304 | 290 | 270 | ◯ | ◯ | 5.8 |
| Example 8 | 306 | 291 | 270 | ◯ | ◯ | 5.7 |
| Example 9 | 305 | 290 | 271 | ◯ | ◯ | 7.5 |
| Example 10 | 309 | 293 | 271 | ◯ | ◯ | 6.9 |
| Example 11 | 308 | 293 | 270 | ◯ | ◯ | 6.5 |
| Example 12 | 309 | 294 | 271 | ◯ | ◯ | 6.7 |
| Example 13 | 305 | 291 | 270 | ◯ | ◯ | 8/2 |
| Comparative | 289 | 270 | 221 | X | X | 3.8 |

TABLE 2-continued

| | Battery performance | | | | | |
|---|---|---|---|---|---|---|
| | Initial capacity (mAh/g) | Capacity after 3 cycles (mAh/g) | Capacity after 30 cycles (mAh/g) | Dispersion property | Coating property | Adhesion (g/cm) |
| Example 1 Comparative Example 2 | 300 | 281 | 250 | X | X | 4.3 |
| Comparative Example 3 | 289 | 275 | 231 | X | X | 4.0 |
| Comparative Example 4 | 300 | 279 | 248 | X | X | 4.1 |

INDUSTRIAL APPLICABILITY

As described above, by virtue of the dispersant added at the latter half of the polymerization reaction for forming the binder polymer, the present invention makes an improvement in the stability of binder latex. Furthermore, the present invention achieves improvements in the dispersion property, coating property and adhesion of electrode slurry. In addition, the invention allows a great increase in the capacity of a fabricated secondary battery, and can provide a lithium-ion secondary battery showing a small reduction in battery capacity in charge/discharge cycle tests.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An electrode slurry containing a polymeric composite binder and an electrode active material,
wherein the polymeric composite binder comprises binder polymer and a dispersant chemically bound to a surface of the binder polymer, and the polymeric composite binder is formed by adding the dispersant after the conversion of monomer(s) into the binder polymer reaches a level of at least 50% in a polymerization reaction for forming the binder polymer, and the dispersant is at least one selected from the group consisting of:
(1) a copolymer comprising 50-90 wt % of alkoxypolyalkyleneoxide (meth)acrylic acid ester represented by the following Formula 1, 5-45 wt % of (meth)acrylic acid-derived monomer represented by the following Formula 2, and 0.5-40 wt % of a reactive surfactant represented by the following Formula 3; and
(2) a reactive surfactant represented by the following Formula 3:

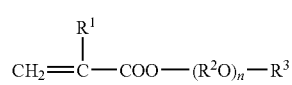
[Formula 1]

wherein $R^1$ is a hydrogen atom or methyl; $R^2O$ is alkylene oxide with 1 to 4 carbon atoms or a mixture of two or more of the alkylene oxides, and if it is the mixture, it can be added in a random or block form; $R^3$ is alkyl with 1 to 4 carbon atoms; and n is an integer of 1-50;

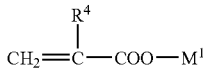
[Formula 2]

wherein $R^4$ a hydrogen atom or methyl; $M^1$ is hydrogen, monovalent metal, divalent metal, ammonium or organic amine;

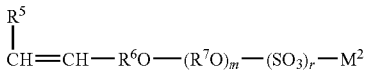
[Formula 3]

wherein $R^5$ a hydrogen atom or methyl; $R^6$ is alkylene with 1 to 4 carbon atom, phenylene or alkyl phenylene with 1 to 4 carbon atoms; $R^7O$ is alkylene oxide with 1 to 4 carbon atoms or a mixture of two or more of the alkylene oxides, and if it is the mixture, it can be added in a random or block form; and $M^2$ is a hydrogen atom, monovalent metal atom, divalent metal atom, ammonium or organic amine group, m is an integer of 10-50, and r is 0 or 1.

2. The electrode slurry of claim 1, wherein the binder polymer is prepared from at least one monomer selected from the group consisting of aromatic vinyl monomer, conjugated diene monomer, (meth)acrylic acid ester monomer, nitrile monomer, and unsaturated carboxylic acid monomer.

3. The electrode slurry of claim 1, which uses water as a dispersion medium.

4. An electrode prepared by coating an electrode slurry containing a polymeric composite binder and an electrode active material on a collector,
wherein the polymeric composite binder comprises binder polymer and a dispersant chemically bound to a surface of the binder polymer, and the polymeric composite binder is formed by adding the dispersant after the conversion of monomer(s) into the binder polymer reaches a level of at least 50% in a polymerization reaction for forming the binder polymer, and the dispersant is at least one selected from the group consisting of:
(1) a copolymer comprising 50-90 wt % of alkoxypolyalkyleneoxide (meth)acrylic acid ester represented by the following Formula 1, 5-45 wt % of (meth)acrylic acid-derived monomer represented by the following Formula 2, and 0.5-40 wt % of a reactive surfactant represented by the following Formula 3; and
(2) a reactive surfactant represented by the following Formula 3:

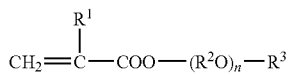
[Formula 1]

wherein $R^1$ is a hydrogen atom or methyl; $R^2O$ is alkylene oxide with 1 to 4 carbon atoms or a mixture of two or more of the alkylene oxides, and if it is the mixture, it can be added in a random or block form; $R^3$ is alkyl with 1 to 4 carbon atoms; and n is an integer of 1-50;

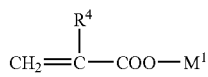
[Formula 2]

wherein $R^4$ a hydrogen atom or methyl; $M^1$ is hydrogen, monovalent metal, divalent metal, ammonium or organic amine;

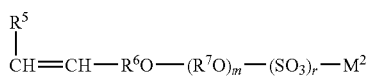
[Formula 3]

wherein $R^5$ a hydrogen atom or methyl; $R^6$ is alkylene with 1 to 4 carbon atom, phenylene or alkyl phenylene with 1 to 4 carbon atoms; $R^6O$ is alkylene oxide with 1 to 4 carbon atoms or a mixture of two or more of the alkylene oxides, and if it is the mixture, it can be added in a random or block form; and $M^2$ is a hydrogen atom, monovalent metal atom, divalent metal atom, ammonium or organic amine group, m is an integer of 10-50, and r is 0 or 1.

5. The electrode of claim 4, wherein the binder polymer is prepared from at least one monomer selected from the group consisting of aromatic vinyl monomer, conjugated diene monomer, (meth)acrylic acid ester monomer, nitrile monomer, and unsaturated carboxylic acid monomer.

6. A secondary battery comprising an electrode prepared by coating an electrode slurry containing a polymeric composite binder and an electrode active material on a collector, wherein the polymeric composite binder comprises binder polymer and a dispersant chemically bound to the surface of the binder polymer, and the dispersant is at least one selected from the group consisting of:

(1) a copolymer comprising 50-90 wt % of alkoxypolyalkyleneoxide (meth)acrylic acid ester represented by the following Formula 1, 5-45 wt % of (meth)acrylic acid-derived monomer represented by the following Formula 2, and 0.5-40 wt % of a reactive surfactant represented by the following Formula 3; and (2) a reactive surfactant represented by the following Formula 3:

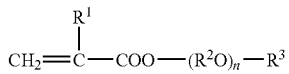
[Formula 1]

wherein $R^1$ is a hydrogen atom or methyl; $R^2O$ is alkylene oxide with 1 to 4 carbon atoms or a mixture of two or more of the alkylene oxides, and if it is the mixture, it can be added in a random or block form; $R^3$ is alkyl with 1 to 4 carbon atoms; and n is an integer of 1-50;

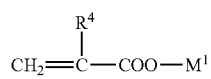
[Formula 2]

wherein $R^4$ a hydrogen atom or methyl; $M^1$ is hydrogen, monovalent metal, divalent metal, ammonium or organic amine;

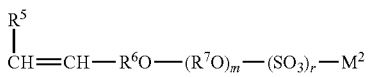
[Formula 3]

wherein $R^5$ a hydrogen atom or methyl; $R^6$ is alkylene with 1 to 4 carbon atom, phenylene or alkyl phenylene with 1 to 4 carbon atoms; $R^7O$ is alkylene oxide with 1 to 4 carbon atoms or a mixture of two or more of the alkylene oxides, and if it is the mixture, it can be added in a random or block form; and $M^2$ is a hydrogen atom, monovalent metal atom, divalent metal atom, ammonium or organic amine group, m is an integer of 10-50, and r is 0 or 1.

7. The secondary battery of claim 6, wherein the dispersant is added after the conversion of monomer(s) to the binder polymer reached a level of at least 50% in a polymerization reaction for forming the binder polymer.

8. The secondary battery of claim 6, wherein the binder polymer is prepared from at least one monomer selected from the group consisting of aromatic vinyl monomer, conjugated diene monomer, (meth)acrylic acid ester monomer, nitrile monomer, and unsaturated carboxylic acid monomer.

* * * * *